Nov. 1, 1932.  H. CREMER  1,885,417
STEERING APPARATUS
Filed Sept. 2, 1931
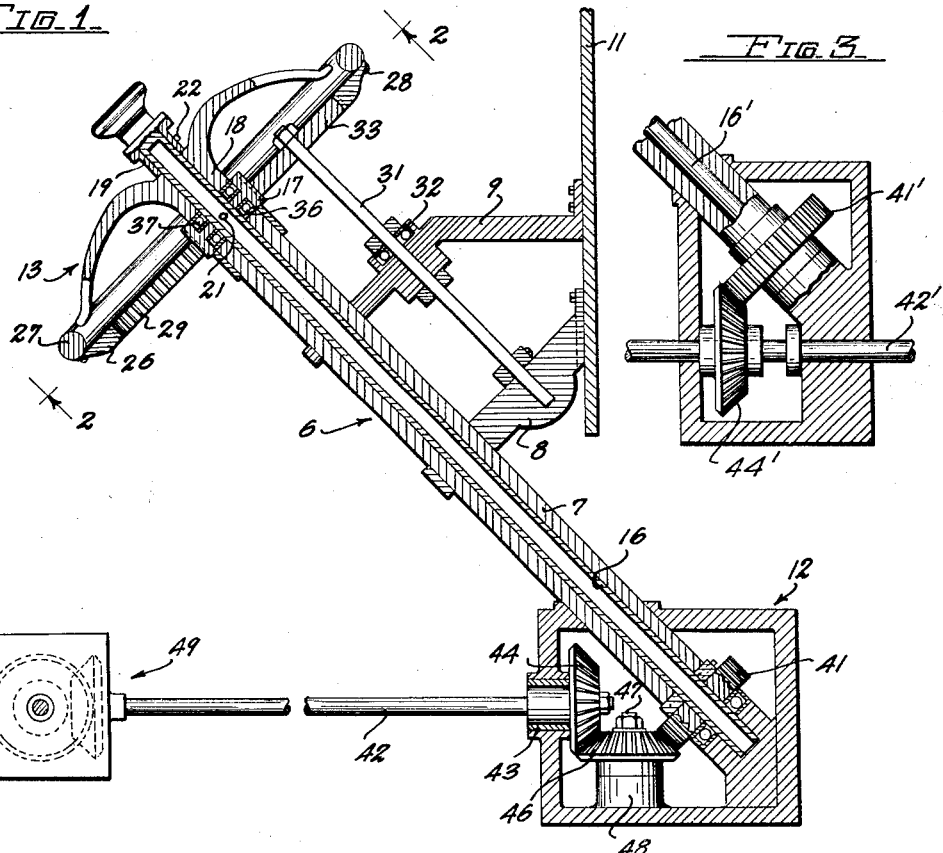
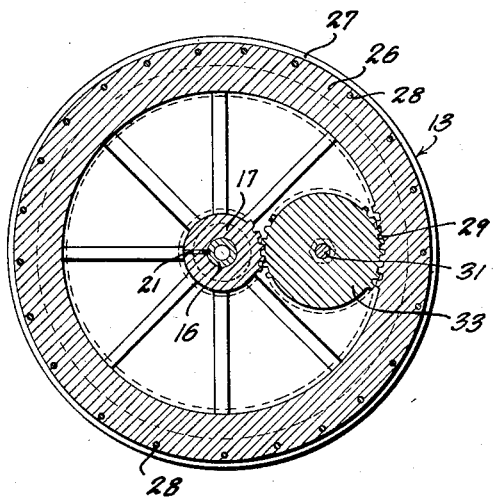
INVENTOR
H. CREMER
BY Hazard and Miller
ATTORNEYS Patented Nov. 1, 1932

1,885,417

UNITED STATES PATENT OFFICE

HENRY CREMER, OF SOUTH GATE, CALIFORNIA

STEERING APPARATUS

Application filed September 2, 1931. Serial No. 560,807.

This invention relates to dirigible vehicles, and has for an object the provision of a steering mechanism of novel design adapted for use in connection with vehicles of this general class.

Another object of the invention is to provide a steering mechanism adapted to afford greater convenience to the operator of a dirigible vehicle by decreasing the angular distance through which the steering wheel must be turned in order to effect adjustment of the dirigible wheels through a given angle, i. e., in order to cause the vehicle to turn about a given turning radius.

A further object is to provide a novel type of interconnection between the steering tube and the steering wheel, wherein the ratio of revolution of these two members with respect to each other is changed from that conventionally employed.

A further object is to provide means for attaining a predetermined ratio of the rotation of the steering wheel to the angular adjustment of the dirigible wheels of the vehicle, which means are mounted exclusively within or upon the steering column assembly, thereby obviating the necessity of changing any of the steering mechanism which is interposed between the steering column and the dirigible wheels.

A still further object is to provide an improved steering mechanism adapted to operate as hereinabove described, which is of a very simple nature, and which, accordingly, is adapted to be installed upon an automobile or other type of dirigible vehicle at relatively little expense.

The invention possesses other objects and advantageous features, some of which, with those enumerated, will be set forth in the following description of the invention's particular embodiments which are illustrated in the drawing accompanying and forming a part of the specification.

Referring to the drawing:

Fig. 1 is a longitudinal vertical sectional view taken through a steering mechanism embodying the principles of the present invention.

Fig. 2 is a transverse sectional view taken through the steering wheel substantially upon the line 2—2 of Fig. 1, with the direction of view as indicated.

Fig. 3 is a vertical sectional view showing a slightly modified form of mechanism for applying power from the steering mechanism to the dirigible wheels of the vehicle.

In terms of broad inclusion, the device of the present invention comprises means for interconnecting the steering wheel of a dirigible vehicle with the steering tube so as to attain a predetermined ratio between their rates of revolution. The common practice has been to connect the steering gear directly to the steering tube, so that they are both caused to rotate at the same speed. The present invention seeks to provide means for rotating the steering tube at a greater speed, and hence through a greater angular distance in relation to the movement of the steering wheel, so that the steering wheel need not be turned through as great an angular distance, as compared with the conventional steering mechanism, in order to effect a given adjustment of the dirigible wheels of the vehicle.

More specifically described, the steering mechanism of the present invention comprises a steering column, indicated in its entirety at 6. In accordance with conventional practice, the steering column 6 includes a tubular housing or steering column jacket 7, suitably supported in oblique position by one or more brackets 8, 9 which connect the jacket 7 rigidly to the dashboard or instrument board 11 of the vehicle upon which the steering mechanism is mounted. The lower end of the jacket 7 extends into a gear housing 12, and the upper end is disposed in such position that the steering wheel 13 which is revolubly mounted thereupon, is supported in a conveniently accessible position to the operator of the vehicle.

A preferably tubular steering shaft 16 extends through the bore of the jacket 7, and is revoluble with respect thereto. As it is customary in present day automobile construction to extend the rods or tubes whereby the ignition throttle and lighting switch are controlled, through the steering tube, the shaft 16 is preferably in the form of a tube to permit such control rods (not shown) to extend therethrough if desired. However, this is immaterial insofar as the present invention is concerned, and the steering shaft 16 could be of solid construction instead of tubular construction, if for any reason such construction is preferable.

The upper end of the steering shaft 16 extends beyond the upper end of the jacket 7 far enough to receive a driven gear 17 thereon and to accommodate the hub 18 of the steering wheel 13 and a retaining collar 19. The gear 17 is rigidly connected to the steering shaft 16 by any suitable means, such as a pin 21. The steering wheel 13, however, is free to rotate with respect not only to the jacket 7, but also to the steering shaft 16. Axial movement of the steering wheel 13 with respect to the shaft 16 is prevented by a collar 19 which is rigidly secured to the shaft 16 as by a set screw 22.

A ring 26 is rigidly secured to the steering wheel 13, preferably to the under side of the rim 27 thereof, as by rivets or screws 28. The ring 26 is disposed coaxially with respect to the rim 27, and is provided with teeth 29 extending preferably throughout the entire inner periphery thereof.

A countershaft 31 is carried by the brackets 8 and 9, and extends adjacent and parallel to the jacket 7. Preferably the countershaft 31 is free to rotate with respect to the brackets, and is provided with one or more antifriction bearings 32. The countershaft 31 carries an idler gear 33 which enmeshes both the driven gear 17 on the shaft 16, and the teeth 29 of the ring 26, thereby interconnecting the steering shaft 16 and the steering wheel 27. However, in view of the fact that the driven gear 17 is of considerably less diameter than the driving gear or ring 26, rotation of the steering wheel 27 through a given angular distance will cause the steering shaft 16 to rotate through a considerably greater angular distance. In other words, in order to cause the steering shaft 16 to turn through a given distance, it is necessary to turn the steering wheel through a much lesser distance than would be the case if the steering wheel were connected directly to the steering shaft, in accordance with conventional practice.

Preferably, an antifriction bearing 36 is interposed between the upper end of the jacket 7 and the driven gear 17, and another antifriction bearing 37 is interposed between the driven gear 17 and the hub 18 of the steering wheel 13.

The lower end of the steering shaft or tube 16 extends beyond the lower end of the jacket 7, and has a gear 41 rigidly mounted thereupon within the gear housing 12. Any suitable means may be employed for transmitting power from the gear 41 to the dirigible wheels (not shown) which are to be controlled by the steering mechanism hereinabove described. For example, a horizontal shaft 42 is journaled adjacent one end in a suitable bearing 43 in one of the vertical walls of the housing 12, and carries a gear 44 which is interconnected with the gear 41 by an idler gear 46 carried by a suitable pintle 47 mounted upon a boss 48 within the housing 12. The shaft 42 may be connected with the dirigible wheels by any suitable connecting mechanism, indicated in its entirety at 49.

Fig. 3 shows a slightly modified form of mechanism for transmitting power from the steering shaft 16′ to the horizontal shaft 42′. Here the gear 41′, which is rigid with the steering shaft 16′, enmeshes directly with the gear 44′ carried by the shaft 42′, the result being that the shaft 42′ rotates in the opposite direction, as compared with the shaft 42.

Thus it may be seen that I have provided a very simple and yet efficiently operating mechanism for altering the ratio of rotation of the steering wheel with respect to the steering shaft. Moreover, this mechanism is adapted to be mounted exclusively within and/or upon the steering column assembly 6, thereby avoiding necessity, when installing steering mechanism embodying the principles of the present invention upon an automobile already built, of changing any of the mechanism whereby the steering column is connected to the dirigible wheels.

It is to be understood that the details of the invention as herein disclosed, are subject to alteration within the spirit or scope of the appended claim.

I claim:

In a steering mechanism for a vehicle, a tube rigid with said vehicle, a shaft extending rotatably therethrough, a steering wheel having a rim and mounted adjacent the upper end of said tube, said wheel being revoluble with respect to both said tube and said shaft, a ring rigid on the under side of said rim and disposed coaxially with respect to the steering wheel, teeth formed on the inner periphery of said ring, a driven gear rigid with said shaft and lying within the plane of said ring, a countershaft mounted adjacent said tube, an idler gear carried by said countershaft and connecting said driven gear to said driving gear, and means for connecting said shaft to the dirigible wheels of said vehicle.

In testimony whereof I have signed my name to this specification.

HENRY CREMER.